Figure 2:
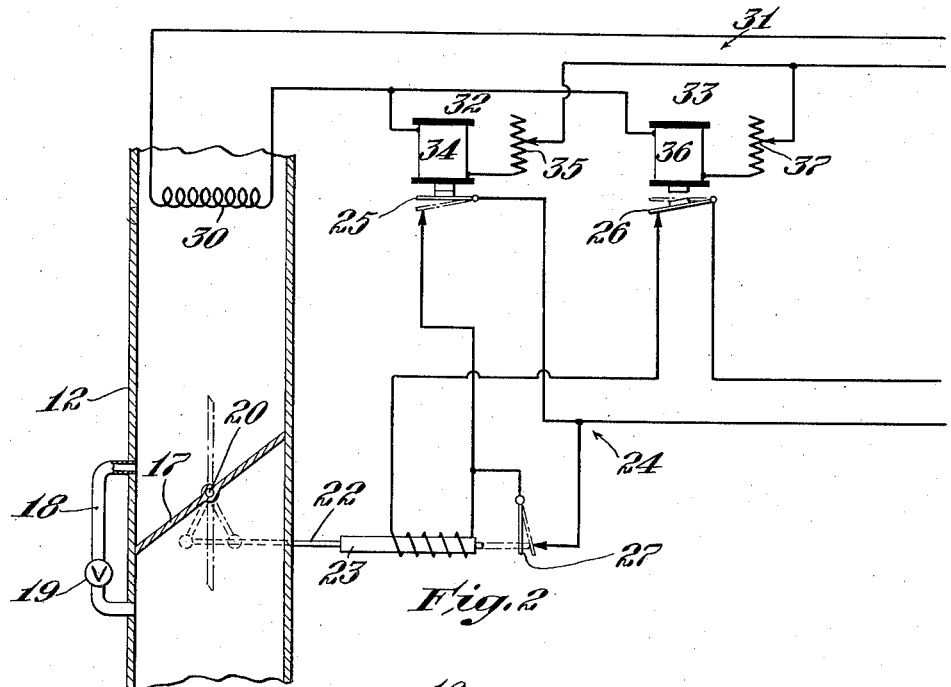

Dec. 6, 1938.   C. S. JENNINGS   2,139,126
PNEUMATIC DISPATCH SYSTEM
Filed Aug. 4, 1937

Inventor
Chester S. Jennings
by Roberts, Cushman & Woodberry
attys.

Patented Dec. 6, 1938

2,139,126

UNITED STATES PATENT OFFICE 2,139,126

PNEUMATIC DISPATCH SYSTEM

Chester S. Jennings, Syracuse, N. Y., assignor to The Lamson Company, Syracuse, N. Y., a corporation of Massachusetts Application August 4, 1937, Serial No. 157,343

8 Claims. (Cl. 243—12)

This invention relates to an improvement in a pneumatic dispatch system and more particularly in a power control therefor.

The primary object of this invention is to provide a power control of the minimum flow type having a valve the opening or closing of which is controlled by electrical responses to the status of the air in the system due to the presence or absence of a carrier in the transmission line.

Figure 1:
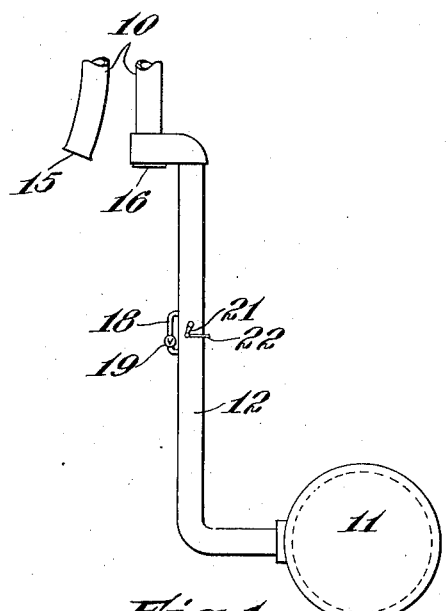

In the drawing:

Fig. 1 illustrates a portion of a pneumatic dispatch system of a suitable type; and Fig. 2 illustrates schematically one form of means by which the valve of a power control is actuated.

The illustrated embodiment of the invention is employed in the system shown in Fig. 1 which comprises a transmission line 10, a drum 11 and and a tube 12 connecting the line and the drum. This system is of the vacuum type, the line 10 having an open inlet 15 and an outlet normally closed by a flapper 16. The tube 12 is connected to the line 10 adjacent its outlet and mounted in the tube is a valve 17 which controls the flow of air from the line to the drum 11 which serves as the source of vacuum or negative pressure. A by-pass 18 provides a continuous flow of air to the drum at all times and is regulated by an adjusting screw 19 or any other suitable means so that when the valve 17 is closed a minimum flow of air at a predetermined rate is maintained.

The valve 17 is fixed upon a cross shaft 20 at least one end of which projects beyond the wall of the tube. Secured to a projecting end of the shaft 20 is an arm 21 attached to one end of the plunger 22 of a solenoid 23 so that the valve is opened when the solenoid is energized and closed when the solenoid is deenergized. The status of the solenoid 23 is determined by an electric circuit 24 which includes a normally open switch 25, a normally closed switch 26 and a normally open switch 27, the switches 25 and 27 being in parallel. As shown in Fig. 2, when the power control is at rest the valve 17 is closed and a minimum air flow is set up and the circuit 24 is open.

The operation of the valve 17 depends upon the temperature conditions in the interior of the tube 11. This temperature varies inversely to the rate at which the air flows through the tube. It is considered to be normal when the line is open and only a minimum flow of air is set up. When the minimum flow is reduced as by the introduction of a carrier into the line the temperature in the tube is increased. When, however, the flow of air is increased above the minimum flow the temperature in the tube is decreased.

It is an accepted fact that a wire heated by the passage of an electric current therethrough and placed in an air stream will be caused, by a change in the speed of the air stream, to vary in temperature and hence in resistance to such current. The amount of current passing through the wire is obviously affected by the varying resistance. In other words a decrease in the speed of the air stream causes a reduction in the resistance and a consequent increase in current and an increase in such speed causes an increase in the resistance and a consequent reduction in current.

Mounted in the tube 12 above the valve 17 is a coil 30 of highly sensitive wire, for example platinum or nickel, the electrical resistance of which varies directly with its temperature so that when the temperature in the tube varies due to the change in air speed the resistance of the coil varies accordingly. The coil 30 is an element of a circuit 31 through which current having a low potential (six or twelve volts) flows to heat the coil to a predetermined temperature when the power control is at rest. In the circuit 31 are relay units 32 and 33. The unit 32 is associated with the normally open switch 25 of the circuit 24 and comprises a magnet 34 and an adjustable resistance element 35. The unit 33 is associated with the normally closed switch 26 of the circuit 24 and comprises a magnet 36 and an adjustable resistance element 37. The elements 35 and 37 are so set that under normal conditions the amount of current flowing through the magnet 34 is sufficient to energize it and cause it to raise the switch 25 while the amount of current flowing through the magnet 36 is not sufficient to energize it and cause it to raise the switch 26 against the force of gravity.

When a carrier is inserted in the transmission line 10, as at the inlet 15, the flow of air through the tube 12 is reduced and hence the temperature of the coil 30 is increased. This increase in temperature increases the electrical resistance of the coil and thus reduces the amount of current flowing in the circuit 31. This reduction in turn reduces the energization of the magnet in the relay unit 32 to such an extent that the switch 25 closes, the force exerted by gravity overpowering that exerted by the magnet. The circuit 24 is thus completed, energizing the solenoid 23 and causing it to open the valve 17 whereupon the piston 22 closes the switch 27.

As the carrier travels through the line the rate of air flow in the tube 12 increases thus reducing the temperature of the coil 30 and thereby reducing its electrical resistance. The amount of current flowing through the magnet 34 is thereby increased so that it is energized sufficiently to raise the switch 25 into its normal open position. The switch 27, however, being closed this opening of the switch 25 will not break the circuit through the solenoid 23 and the valve 17 will remain open.

The resistance 37 is however so set that even though the amount of current be increased the magnet 36 will not be energized to a point at which the switch 26 is raised and the circuit 24 is broken.

The discharge of the carrier sets up a rush of air through the tube thus further lowering the temperature of the coil and reducing its resistance to such an extent that the increase in current through the relay unit 33 is now sufficient to cause the magnet 36 to raise the switch 26 thus breaking the circuit 24. The solenoid 23 will thereupon release the plunger 22 so that the valve 17 is closed and the switch 27 opened. Springs or other suitable means (not shown) insure the restoration of the valve and plunger to their normal positions. Upon the closure of the valve the minimum flow of air through the tube is restored whereupon the temperature and the resistance of the coil return to normal and the current flowing through the circuit 31 is sufficient to energize the magnet 34 so that it holds the switch 25 open and is not sufficient to energize the magnet 36 so that it overcomes the force of gravity tending to close the switch 26.

From the above description it will be apparent that under minimum flow conditions the circuit 24 will be open and that when the flow falls below the minimum flow the circuit 24 will be closed until the flow rises substantially above the minimum flow whereupon the circuit 24 will be opened and the parts restored to their normal position.

While this invention has been shown and described with respect to its use in a system of the vacuum type it can, of course, be used in a system of the pressure type and it will be understood that it is not limited to the particular embodiment here disclosed and that other embodiments may be employed without departing from the spirit and scope of the invention as set forth in the following claims.

I claim:

1. In a pneumatic dispatch system a power control of the minimum flow type comprising a tube, a normally closed valve therein and means actuated by the flow of air through the tube for opening and closing said valve, said means including a solenoid which when energized opens said valve and an electric circuit by which the solenoid is energized, one element of said circuit being a coil in the flow of air through the tube, which coil is heated to a predetermined temperature under minimum flow conditions and is raised above said temperature when the air flow is reduced whereby the solenoid is energized when the temperature of the coil is raised and is deenergized when the temperature of the coil is reduced.

2. In a pneumatic dispatch system a power control of the minimum flow type comprising a tube, a normally closed valve therein and means actuated by the flow of air through the tube for opening and closing said valve, said means including a solenoid which, when energized, opens said valve and, when deenergized closes said valve and an electric circuit by which the status of the solenoid is determined, one element of said circuit being a coil in the flow of air through the tube, which coil is heated to a predetermined temperature under minimum flow conditions and is raised above said temperature when the air flow is reduced whereby the solenoid is energized when the temperature of the coil is raised and is deenergized when the temperature of the coil is reduced.

3. In a pneumatic dispatch system a power control of the minimum flow type comprising a tube, a normally closed valve therein, a coil in the flow of air through the tube, an electric circuit for heating said coil to a predetermined temperature under minimum flow conditions and means for opening and closing said valve, said means being actuated by changes in the temperature of the coil caused by changes in the speed of the air flow through the tube.

4. In a pneumatic dispatch system a power control of the minimum flow type comprising a tube, a normally closed valve therein, a coil in the flow of air through the tube, an electric circuit for heating said coil to a predetermined temperature under minimum flow conditions, the temperature of the coil increasing when the flow of air is reduced and reducing when that flow is increased, and means controlled by such increase and decrease of the temperature of the coil, for opening and closing said valve, said means including a solenoid which, when energized, opens said valve and an electric circuit which, when closed, energizes said solenoid, said last named circuit being closed by switch means controlled by said first named circuit.

5. In a pneumatic dispatch system a power control of the minimum flow type comprising a tube, a normally closed valve therein, a coil in the flow of air through the tube, an electric circuit for heating said coil to a predetermined temperature under minimum flow conditions, the temperature of the coil increasing when the flow of air is reduced and reducing when that flow is increased, and means controlled by such increase and decrease of the temperature of the coil, for opening and closing said valve, said means including a solenoid which, when energized, opens said valve and, when deenergized, closes said valve and an electric circuit by which the status of the solenoid is determined, said last named circuit including switch means by which the circuit is opened or closed and said first named circuit including relay means which control said switch means.

6. In a pneumatic dispatch system a power control of the minimum flow type comprising a tube, a normally closed valve therein, a coil in the flow of air through the tube, an electric circuit for heating said coil to a predetermined temperature under minimum flow conditions, the temperature of the coil increasing when the flow of air is reduced and reducing when that flow is increased, and means controlled by such increase and decrease of the temperature of the coil, for opening and closing said valve, said means including a solenoid which, when energized, opens said valve and, when deenergized, closes said valve, and an electric circuit by which the status of the solenoid is determined, said last named circuit including a normally closed switch and a normally opened switch and said first named circuit including two relays, one associated with the normally closed switch and the other associated with the normally opened switch, the relays in response to the fluctuations of the current in the circuit due to the change in temperature of the coil, acting to close the normally open switch and thereafter to open such switch and also the normally closed switch.

7. Electrical means for operating the valve of a power control of the minimum flow type for a pneumatic dispatch system comprising a coil of wire in the flow of air, an electric circuit by which current flows through the coil and maintains it at a predetermined temperature under minimum flow conditions, a solenoid which when energized opens said valve and when denergized closes said valve, a second electric circuit normally open by which the status of the solenoid is maintained, a normally closed switch and a normally opened switch in said second circuit and relays in said first circuit associated with said switches whereby as changes in the speed of the air flow alter the temperature of the coil and the amount of current passing through said relays the latter act upon the said switches to close or open the second circuit.

8. Electrical means for operating the valve of a power control of the minimum flow type for a pneumatic dispatch system comprising a coil of wire in the flow of air, an electric circuit by which current flows through the coil and maintains it at a predetermined temperature under minimum flow conditions, a solenoid which when energized opens said valve and when denergized closes said valve, a second electric circuit normally open by which the status of the solenoid is maintained, a normally closed switch and two normally opened switches in said second circuit, two relays in said first circuit associated with said normally closed switch and one of said normally opened switches, whereby as changes in the speed of the air flow alter the temperature of the coil and the amount of current passing through said relays the latter act upon the switches associated therewith to close and thereafter open said second circuit and said solenoid being so positioned relative to the second normally opened switch that, when energized by the closing of the circuit it closes the switch and when deenergized by the opening of the circuit permits the switch to resume its normal opened position.

CHESTER S. JENNINGS.